E. H. DIMLER.
SHAFT SECURING DEVICE.
APPLICATION FILED OCT. 29, 1909.
966,666.
Patented Aug. 9, 1910.
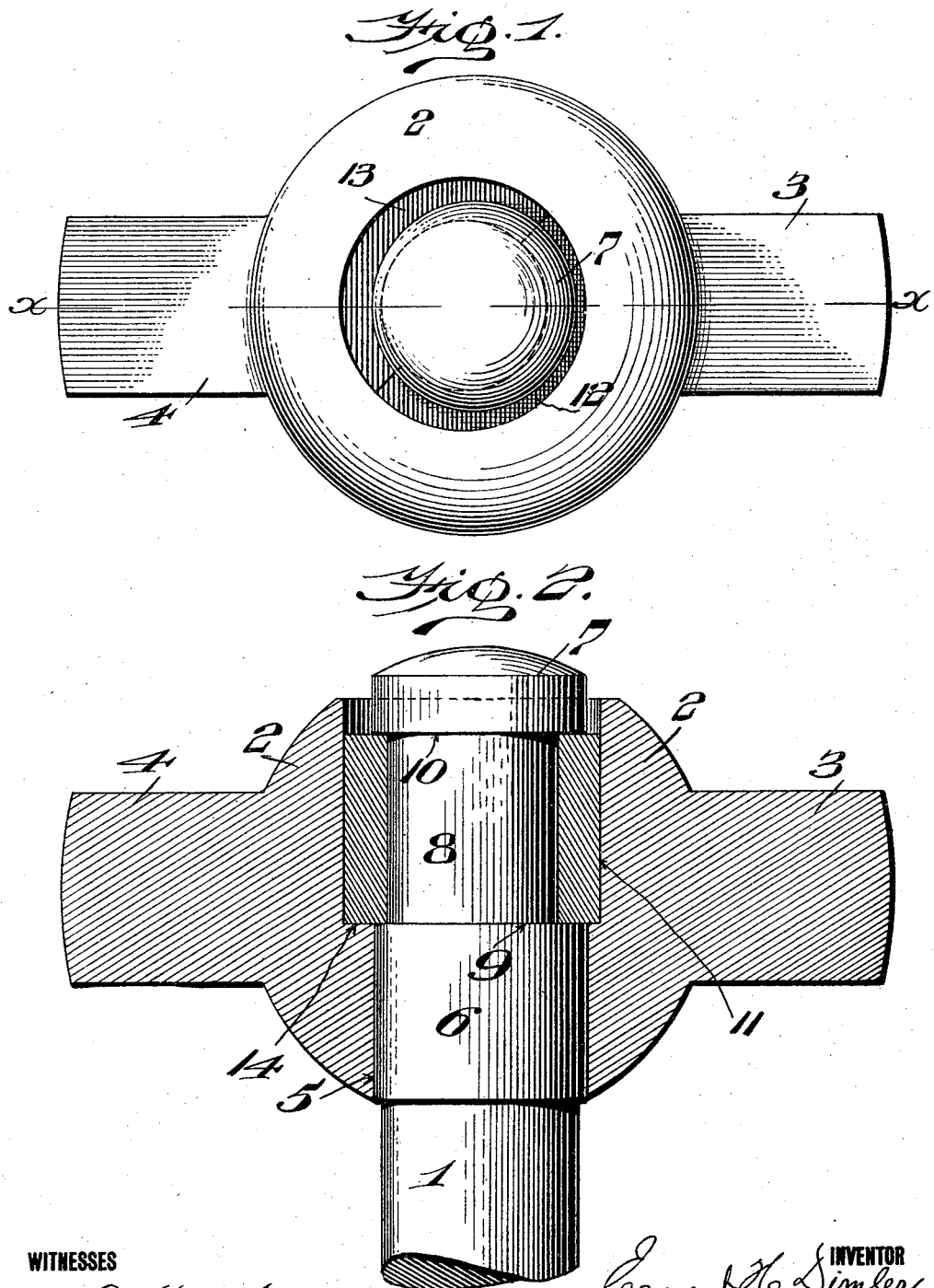

UNITED STATES PATENT OFFICE.

ERNEST H. DIMLER, OF SOUTH BETHLEHEM, PENNSYLVANIA, ASSIGNOR OF ONE-HALF TO BETHLEHEM FOUNDRY & MACHINE COMPANY, OF SOUTH BETHLEHEM, PENNSYLVANIA, A CORPORATION OF PENNSYLVANIA.

SHAFT-SECURING DEVICE.

966,666.  Specification of Letters Patent.  Patented Aug. 9, 1910.

Application filed October 29, 1909. Serial No. 525,310.

*To all whom it may concern:*

Be it known that I, ERNEST H. DIMLER, a citizen of the United States, residing in the city of South Bethlehem, county of Northampton, State of Pennsylvania, have invented a new and useful Shaft-Securing Device, of which the following is a specification.

The purpose of my invention is to provide a novel secure and simple form of attachment between the shaft and ball and trunnion of a Griffin mill.

A further purpose of my invention is to provide a form of the quick and effective support for a shaft subject to motion other than that of rotation.

A further purpose of my invention is to make the angular motion of the shaft of a Griffin mill assist in securing the shaft in place.

A further purpose of my invention is to cause the twisting movement of a Griffin mill to set an eccentric in its support at the same time that the shaft itself has direct thrust support against downward movement.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 is a top plan view of one form of my invention. Fig. 2 is a section upon line *x—x*, of Fig. 1.

Similar numerals of reference indicate corresponding parts in the figures.

Referring to the drawings:—My invention makes use of the torsional strains upon the shaft of a Griffin mill to more effectively engage the shaft with the ball and trunnion support thereof and provides direct thrust support in the ball with a removable member which also is itself in direct thrust engagement with a portion of the shaft.

For the reason that the ball and trunnion support for the shaft and the shaft itself are the only parts affected by my invention and that my invention is applicable to structures having great variety as to other features than the shaft and support thereof, I have considered it unnecessary to illustrate more than the ball, trunnion, shaft and connecting members.

1 designates a shaft to be mounted, a support, here shown as the ball 2 connected with trunnions 3 and 4. For convenience in passing the shaft up through the ball to permit access to the upper part of the shaft I form the portion of the shaft intended to lie in the cylindrical bore 5 within the lower part of the ball as an enlargement 6 upon the shaft making a suitable sliding fit within this bore 5. I preferably form the upper end of the shaft with a head at 7 which may be of the same diameter as the portion 6 and which is preferably of this size in order that the shaft may have as large a head as possible and yet may be withdrawn downwardly through the ball and trunnion. In structures otherwise rendering it unnecessary to take the shaft out downwardly and in which the eccentric locking feature is desired, this cap may be of enlarged diameter.

Between the cylindrical portions 6 and 7 I form a neck at 8 eccentric thereto, resulting in shoulders at 9 and 10 for a purpose to be hereinafter described.

I provide a cylindrical enlargement or counterbore 11 within the upper portion of the ball which is eccentric to the cylindrical bore 5, which bore and counterbore 11 are parallel with each other just as the axes of the cylindrical portions 6 and 8 of the shaft are parallel, though eccentric to each other.

I form the counterbore preferably with the same degree of eccentricity to the bore 5 as that of the neck 8 to the cylindrical portion 6 in order that in a certain position annularly with respect to the ball there may be room between the neck and the counterbore for a cylindrical sleeve of uniform thickness, which sleeve I have indicated as split into two parts 12 and 13 for convenience of application to the shaft. This sleeve agrees in internal diameter with the neck of the shaft and in outer diameter with the bore of the counterbore and rests when in place upon the shoulder 14, between the bore and the counterbore. The sleeve, in turn, gives direct thrust support to the shoulder 10 under the cap end of the shaft.

Where the eccentricities of the bore with respect to the counterbore and the portion 6 of the shaft with respect to the neck are not alike it may evidently be equalized by forming the hole in the collar eccentric to the circumference of the collar by an amount corresponding to the difference. I provide a thread 15 for the purpose of admitting a screw eye by which the shaft may be supported.

In assembling my shaft within the ball and trunnion I pass the shaft up through the ball until the neck 8 is freely accessible, when I place the sleeve upon the neck and turn the shaft until the sleeve thus eccentrically placed coincides with the counterbore. I thus pass the shaft with the sleeve upon it down into the bore and counterbore of the ball until the lower part of the sleeve rests upon the shoulder 14. The head or cap of the shaft is at the same time supported upon the upper portion of the sleeve, each of these supports being by direct thrust. A slight rotation of the shaft with respect to the ball tightens the shaft within the ball.

It will be evident that the character of support within which the shaft is to be held may be varied and that the relation of the several sizes and positions of the parts may also be changed in the shaft for different uses and to suit the convenience and judgment of different intending users. It is also evident that the rotary motion by which the locking of the cam or eccentric affect portions of the shaft is accomplished may be put into effect by other instrumentalities manual or machine than by the particular use and form of motion which is made use of in the Griffin mill. It is my desire and intent to cover such several variations in construction and use of the structure as properly fall within the scope of the claims of my application.

Having thus described my invention, what I claim as new and desire to secure by Letters Patent, is:—

1. In a device of the character stated, a ball having a bore and a counterbore therein axially out of line with each other in combination with a shaft fitting the bore and having a reduced neck axially out of line therewith, and a cylindrical collar engaging said neck and fitting within the counterbore.

2. In a device of the character stated, a ball having a bore and a counterbore therein axially out of line with each other in combination with a shaft fitting the bore and having a reduced neck axially out of line with said shaft, and a cylindrical split ring fitting upon the reduced neck and fitting into the counterbore.

3. In a device of the character stated, a ball having a cylindrical bore and counterbore therein axially out of line, in combination with a cylinder, a shaft, and means for fastening said cylinder upon the shaft with the axis of the cylinder out of line with the axis of the shaft to the same extent as the axis of the counterbore is outside the axis of the bore.

4. In a device of the character stated, a ball having a cylindrical bore in the lower part thereof and a cylindrical counterbore in the upper part thereof axially out of line with the bore and providing a shoulder therebetween in combination with a shaft having a cylindrically reduced portion axially out of line with the rest of the shaft, forming a head enlarged with respect to said reduced portion and providing a shoulder beneath said head and a cylindrical split sleeve mounted upon the reduced portion of the shaft, resting upon the shoulder between the bore and counterbore and supporting the shoulder upon the head of the shaft.

5. In a device for fastening shafts, a support having a bore and counterbore, a shaft having a portion eccentric to the axis of said shaft, a head upon the shaft, and a sleeve surrounding said eccentric portion and fitting the counterbore.

6. A shaft, having a portion thereof eccentric thereto and wholly within the cylinder defined by the surface of the shaft, a head upon the shaft, and a member having a bore fitting the shaft, and a counterbore, in combination with a sleeve surrounding the eccentric portion of the shaft and fitting the counterbore.

7. A shaft eccentrically reduced at an intermediate point and thereby providing a head and a shoulder at the limits of the reduced portion, a member to be connected therewith provided with a bore and a counterbore forming a shoulder between, and a divided collar about the eccentric portion of the shaft lying between the two shoulders.

8. In a device of the character stated, a ball and trunnion, a shaft therein, and means between the ball and trunnion and shaft eccentric to the axis of the shaft supporting the shaft and causing wedge engagement between it and the ball and trunnion with relative torsional movement.

ERNEST H. DIMLER.

Witnesses:
 ROBERT W. FLUCK,
 EDWIN J. STELTZ.